(12) United States Patent
Viita-Aho et al.

(10) Patent No.: US 11,034,552 B2
(45) Date of Patent: Jun. 15, 2021

(54) PASSENGER CONVEYOR

(71) Applicant: Kone Corporation, Helsinki (FI)

(72) Inventors: Tarvo Viita-Aho, Helsinki (FI); Jorma Mustalahti, Hyvinkaa (FI); Raimo Pelto-Huikko, Helsinki (FI); Janne Laine, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 16/804,239

(22) Filed: Feb. 28, 2020

(65) Prior Publication Data
US 2020/0198935 A1 Jun. 25, 2020

Related U.S. Application Data

(63) Continuation of application No. PCT/FI2017/050610, filed on Aug. 30, 2017.

(51) Int. Cl.
*B66B 29/00* (2006.01)
*B66B 21/04* (2006.01)
(Continued)

(52) U.S. Cl.
CPC ............ *B66B 29/00* (2013.01); *B66B 21/04* (2013.01); *B66B 21/10* (2013.01); *F16D 63/006* (2013.01);
(Continued)

(58) Field of Classification Search
CPC ......... B66B 29/00; B66B 23/02; B66B 21/04; B66B 21/10; B66B 23/026; F16D 63/006; F16D 2125/28
(Continued)

(56) References Cited

U.S. PATENT DOCUMENTS

| 6,273,235 B1 * | 8/2001 | Inoue | B66B 23/02 |
| | | | 198/330 |
| 7,497,315 B2 * | 3/2009 | Fargo | B66B 23/02 |
| | | | 198/322 |

(Continued)

FOREIGN PATENT DOCUMENTS

WO    WO-2017033271 A1    3/2017

OTHER PUBLICATIONS

International Search Report PCT/ISA/210 for International Application No. PCT/FI2017/050610 dated Feb. 13, 2018.

(Continued)

*Primary Examiner* — James R Bidwell
(74) *Attorney, Agent, or Firm* — Harness, Dickey & Pierce, P.L.C.

(57) ABSTRACT

The invention relates to a passenger conveyor, such as an escalator or autowalk, comprising a band of conveying elements; a diverting wheel for diverting the passage of the band of conveying elements and/or a traction member thereof and a brake for braking rotation of the diverting wheel. The brake comprises a screw member having a conical threaded external rim; a nut member having a conical threaded internal rim, the screw member and nut member being screwed together, one of said screw member and nut member being connected with the diverting wheel for being driven by the diverting wheel. The brake further comprises a stopping device for stopping rotation of the other of said screw member and nut member.

24 Claims, 5 Drawing Sheets

(51) Int. Cl.
  *B66B 21/10*    (2006.01)
  *F16D 63/00*    (2006.01)
  *B66B 23/02*    (2006.01)
  *F16D 121/20*   (2012.01)
  *F16D 125/28*   (2012.01)

(52) U.S. Cl.
  CPC ........... *B66B 23/024* (2013.01); *B66B 23/026* (2013.01); *F16D 2121/20* (2013.01); *F16D 2125/28* (2013.01)

(58) Field of Classification Search
  USPC ................................ 198/322, 323, 326, 330
  See application file for complete search history.

(56) References Cited

U.S. PATENT DOCUMENTS

| | | | |
|---|---|---|---|
| 7,950,514 B1 * | 5/2011 | Nurnberg ................. | H02P 3/16 |
| | | | 198/323 |
| 8,800,743 B2 * | 8/2014 | Berger .................... | B66B 23/14 |
| | | | 198/322 |
| 2008/0067034 A1 | 3/2008 | Illedits et al. | |
| 2014/0014464 A1 * | 1/2014 | Berger .................... | B66B 29/00 |
| | | | 198/322 |

OTHER PUBLICATIONS

Written Opinion of the International Searching Authority PCT/ISA/237 for International Application No. PCT/FI2017/050610 dated Feb. 13, 2018.

\* cited by examiner

PASSENGER CONVEYOR

CROSS-REFERENCE TO RELATED APPLICATION

This application is a continuation of PCT International Application No. PCT/FI2017/050610 which has an International filing date of Aug. 30, 2017, the entire contents of which are incorporated herein by reference

FIELD OF THE INVENTION

The invention relates to stopping of movement of a passenger conveyor, such as an escalator or a moving ramp.

BACKGROUND OF THE INVENTION

Escalators and moving ramps are passenger conveyors, each of which typically comprises an endless band of conveying elements, such as steps or pallets for supporting the load to be transported, i.e. a person. The conveying element typically comprises guide rollers and a tread member with a tread surface on which a person can stand. The conventional passenger conveyors furthermore comprise elongated guide rails for guiding and supporting the guide rollers of the conveying elements. The conveying elements are typically connected to each other. They are typically connected to each other by a traction member such as a chain. However, alternatively they can be directly connected to each other, which is the case in some moving ramps particularly. In this case a separate traction member may not be needed at all as the conveying members can transmit traction to each other directly. In the first mentioned type, the drive member can be on one or both lateral sides of each conveying element, for instance. It is typical that one guide roller of the step is coupled with a chain link of the chain. Thereby, the chain becomes guided by the guide rollers as well. The passenger conveyors are typically arranged to divert the path of its moving parts at its upper and lower end by a diverting wheel, which diverting wheel diverts passage of the chain and the conveying elements.

For moving the conveying elements, the passenger conveyor comprises typically a machinery comprising a motor, and for stopping movement of the conveying elements, the machinery can comprise a main brake. It may be that the passenger conveyor also needs to have an auxiliary brake for preventing certain special conditions. Such a special condition is particularly uncontrolled rushing of the people conveyor, which may be caused in free rotation of the main shaft, for instance. Such rushing in downwards direction can take place in passenger conveyors due to passenger weight when the endless band of conveying elements comprises an inclined conveying section for conveying passengers standing on the conveyor elements at an inclined angle. Such a rushing may also be caused by a failure in some part of the machinery, such as braking of the main brake or failure of the motor encoder. A drawback of known passenger conveyors has been that they have not had a reliable, compact and simple brake suitable for serving as an auxiliary brake for stopping of the passenger conveyor in such situations.

BRIEF DESCRIPTION OF THE INVENTION

The object of the invention is to introduce a new passenger conveyor, which is improved in terms of its stopping function. An object is to introduce a solution by which one or more of the above defined problems of prior art and/or drawbacks discussed or implied elsewhere in the description can be solved. An object is to introduce an improved solution which is structurally simple due to having small number of components, compact, produces a great braking force, and can stop movement of the passenger conveyor reliably and swiftly.

It is brought forward a new passenger conveyor, such as an escalator or an autowalk, comprising an endless band of conveying elements. The passenger conveyor may also comprise an endless traction member. The passenger conveyor further comprises a diverting wheel for diverting the passage of the band of conveying elements and/or the aforementioned traction member thereof, as well as a brake for braking rotation of the diverting wheel. The brake comprises a screw member having a conical threaded external rim, and a nut member having a conical threaded internal rim. The threads of the screw and nut are particularly counterparts for each other. The screw member and nut member are screwed together, in particular such that the nut member is around the screw member, their threads engaging each other. One of said screw member and nut member is connected with the diverting wheel for being driven by the diverting wheel. The passenger conveyor further comprises a stopping device for stopping rotation of the other of said screw member and nut member, in particular for thereby causing relative rotation between the screw member and nut member when said one of said screw member and nut member rotates driven by the diverting wheel. With this solution one or more of the above mentioned objects can be achieved. Preferable further details of the passenger conveyor are introduced in the following, which further details can be combined with the passenger conveyor individually or in any combination.

In a preferred embodiment, the screw member and nut member are rotatable together, in particular as one unit, by the diverting wheel. Preferably, this is implemented such that said one of said screw member and nut member connected with the diverting wheel for being driven by the diverting wheel is arranged to transmit rotation to the other of said screw member and nut member, preferably at least partially via their threaded engagement, such that they are rotatable together, in particular as one unit, by the diverting wheel. The threaded engagement can be simply made so tight, e.g. by pre-tightening, that it transmits rotation between said two members. Also, additional or alternative means could of course be used for making the screw member and nut member rotatable together.

In a preferred embodiment, said one of said screw member and nut member is said screw member and said other of said screw member and nut member is said nut member. This could alternatively be vice versa.

In a preferred embodiment, the screw member and nut member have been pre-tightened together by screwing of the screw member into the nut member, preferably with at least 1 Nm torque.

In a preferred embodiment, the screw member and nut member are tightenable together, to engage more firmly with each other, by screwing of the screw member deeper into the nut member, i.e. towards the tip of the conical threaded internal rim.

In a preferred embodiment, rotation of the diverting wheel in its first rotation direction is arranged to cause screwing of the screw member deeper into the nut member, if the stopping device has stopped rotation of said other of said screw member and nut member.

In a preferred embodiment, the band comprises an inclined conveying section for conveying passengers standing on the conveyor elements at an inclined angle upwards or downwards.

In a preferred embodiment, said first direction is the rotation direction in which the diverting wheel rotates when the conveying elements of the inclined section that are accessible to stand on by passengers move at an inclined angle downwards.

In a preferred embodiment, said one of said screw member and nut member is connected with the diverting wheel by a connection transmitting rotation between said one of said screw member and nut member and the diverting wheel in two opposite rotation directions.

In a preferred embodiment, said one of said screw member and nut member is fixed, in particular immovably, on the diverting wheel or the shaft on which the diverting wheel is mounted.

In a preferred embodiment, the nut member is surrounded by an empty space outside it in radial direction whereto it is free to radially expand when tightened together with the screw member and/or the screw member has an empty inside space inside it in radial direction whereto it is free to radially expand when tightened together with the screw member. Preferably, the nut member and screw member are both cylindrical.

In a preferred embodiment, the passenger conveyor comprises a control arrangement arranged to control operation of the stopping device.

In a preferred embodiment, the stopping device comprises at least one stopping member movable to act on the other of said screw member and nut member for stopping rotation thereof, for thereby causing relative rotation between the screw member and nut member, when said one is rotated.

In a preferred embodiment, the control arrangement is arranged to control movement of the at least one stopping member.

In a preferred embodiment, said other of said screw member and nut member comprises a cogged rim, and said stopping member is movable into rotational path of at least one of the cogs of the cogged rim.

In a preferred embodiment, the control arrangement for controlling movement of the at least one stopping member comprises an electrical controller configured to control the stopping device, e.g. over an electrical bus.

In a preferred embodiment, the controller is configured to activate the stopping device to stop rotation of the other of said screw member and nut member, in particular when one or more predetermined criteria are met, preferably including overspeed detected in one or more of moving parts of the conveyor.

In a preferred embodiment, the stopping device comprises an electrically controlled actuator, such as a solenoid. Preferably, the electrically controlled actuator, such as a solenoid as mentioned, is suitable for actuating the stopping member to act on the other of said screw member and nut member for stopping rotation thereof, for thereby causing relative rotation between the screw member and nut member, when said one of said screw member and nut member is rotated. The electrically controlled actuator can be suitable for actuating the stopping member to move into rotational path of at least one of the cogs of the cogged rim, for example.

In a preferred embodiment, the control arrangement for controlling movement of the at least one stopping member comprises a cam wheel and a pendulum pivotal around a fulcrum, the pendulum comprising a roller spring-tightened to run along the cam wheel, the roller being arranged to be moved radially outwards by the cams and returned radially inwards by a spring mechanism, and the roller is arranged to loose contact with the cam wheel, in particular thrown by a cam of the cam wheel, such that the pendulum turns to such a position that a stopping member thereof extends into path of a cog of the aforementioned cogged rim if rotational speed of the cam wheel exceeds a limit. An advantage of the cam wheel operated pendulum is that it provides a mechanical means which are relatively fail safe and which can monitor rotational speed reliably.

In a preferred embodiment, the passenger conveyor is an escalator or an autowalk.

In a preferred embodiment, the passenger conveyor comprises a motor for moving the band of conveying elements.

In a preferred embodiment, the traction member is connected with the conveying elements for transmitting traction force to the conveying elements.

In a preferred embodiment, the aforementioned traction member is a chain.

In a preferred embodiment, the diverting wheel is a sprocket around and against which the traction member and/or conveying elements pass.

In a preferred embodiment, the passenger conveyor is an escalator and said conveying elements are steps.

In a preferred embodiment, each of the conveying elements comprises a tread member with a tread surface on which a person can stand.

In a preferred embodiment, the nut member and the screw member are made of metal.

In a preferred embodiment, the cone angle of the conical threaded external rim of the screw member and the cone angle of the conical threaded internal rim of the nut member are each in the range of 1-20 degrees, most preferably in the range of 5-15 degrees. The cone angles of this kind facilitates that the tightening progresses advantageously. Preferably, said cone angles of the screw member and the nut member are the same or at least substantially the same.

In a preferred embodiment, the rise angle of the threads of the screw member 7 and the rise of the threads of the nut member are in the range of 1-10 degrees, more preferably in the range of 1-5 degrees, most preferably in the range of 1-3 degrees. Preferably, the rise angles of the threads of the screw member 7 and the nut member are the same or at least substantially the same. The rise of this kind facilitates that the tightening progresses advantageously. In a preferred embodiment, the passenger conveyor comprises a first brake, which is the main brake of the passenger conveyor, and a second brake, which is an auxiliary brake of the passenger conveyor, said brake being said second brake.

In a preferred embodiment, the band of conveying elements comprises an inclined conveying section for conveying passengers standing on the conveyor elements at an inclined angle upwards or downwards.

In a preferred embodiment, said screw member and nut member are coaxial with each other, and preferably also with the diverting wheel.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
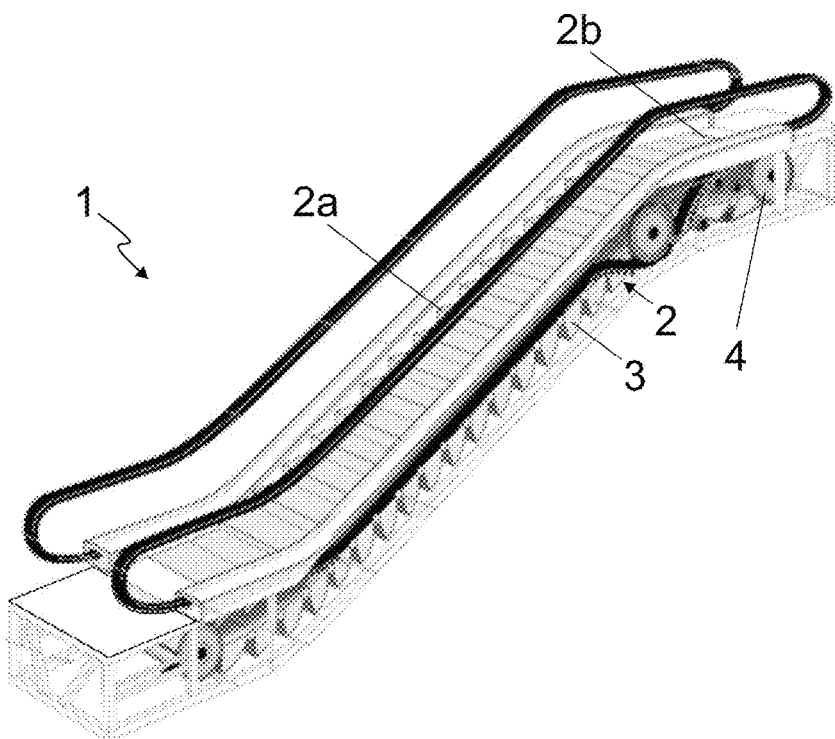
FIG. 1 illustrates a preferred embodiment of the passenger conveyor according to the invention.

FIG. 1 illustrates a passenger conveyor 1, in particular an escalator, comprising an endless band 2 of conveying elements 3, the band 2 comprising an inclined conveying section 2a for conveying passengers standing on the conveyor elements 3 at an inclined angle upwards or downwards. The passenger conveyor 1 moreover comprises a diverting section 2b for diverting the passage of the band 2 of the conveying elements 3.

Figure 2:
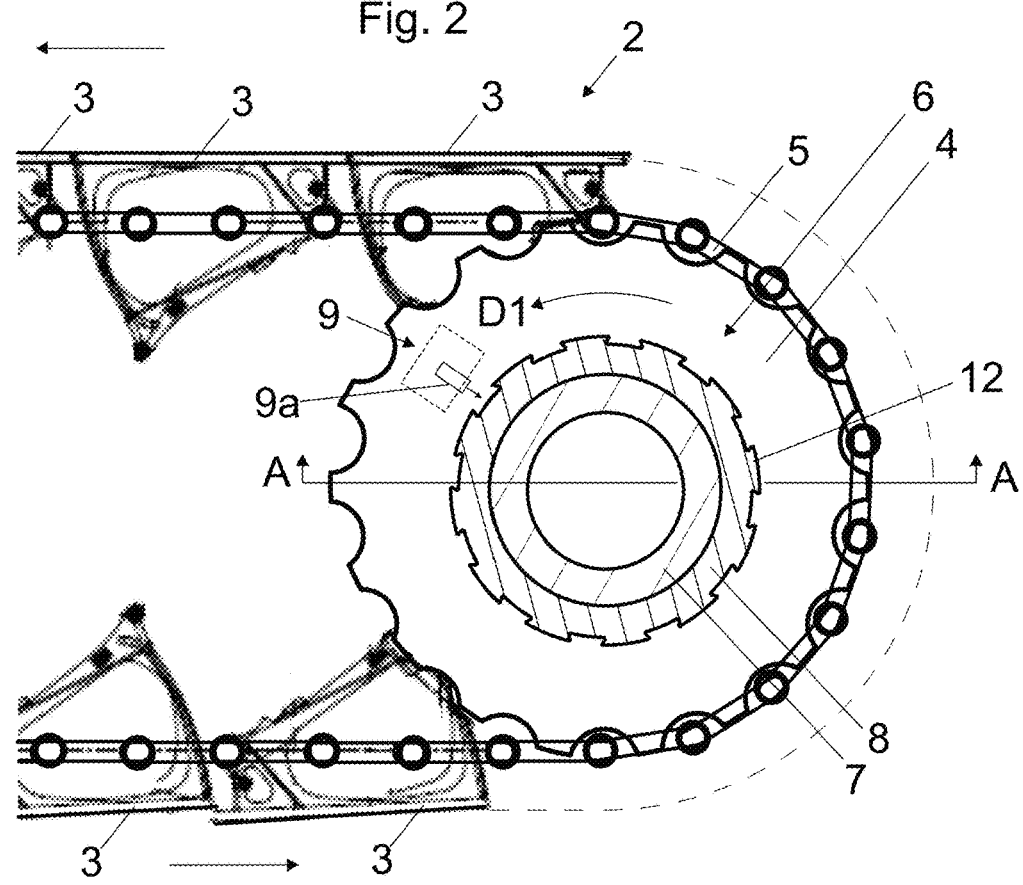
FIG. 2 illustrates preferred details of a brake of the passenger conveyor according to the invention.

In the presented preferred embodiment, the passenger conveyor 1 is an escalator where the conveying elements are connected to each other by an endless traction member, which is in the presented case a chain 5 as presented more precisely in FIG. 2.

The passenger conveyor 1 comprises a diverting wheel 4, which is in the presented preferred embodiment a step chain sprocket wheel, for diverting the passage of the band 2 of conveying elements 3 and a traction member 5 thereof.

The passenger conveyor 1 moreover preferably comprises a motor (not illustrated) for moving the band 2 of conveying elements 3. The motor can be arranged to rotate the diverting wheel 4, whereby the traction member 5 can be moved by the motor for producing traction on the conveying elements 3.

Figure 3:
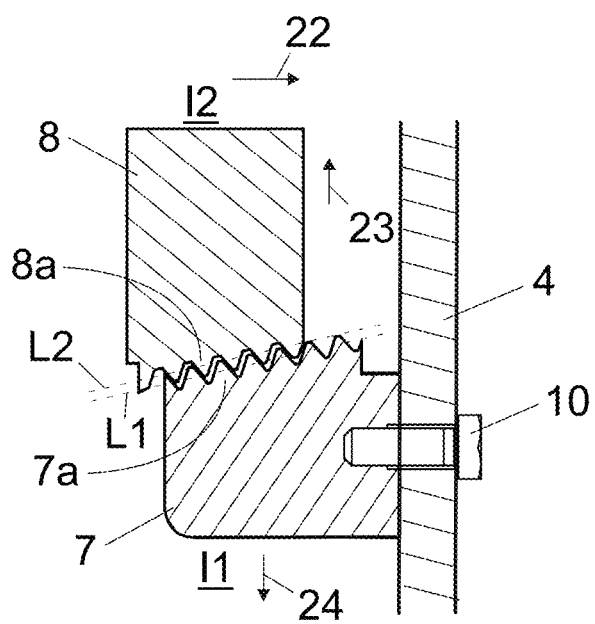
FIG. 3 illustrates cross section A-A of FIG. 2.
Figure 4:
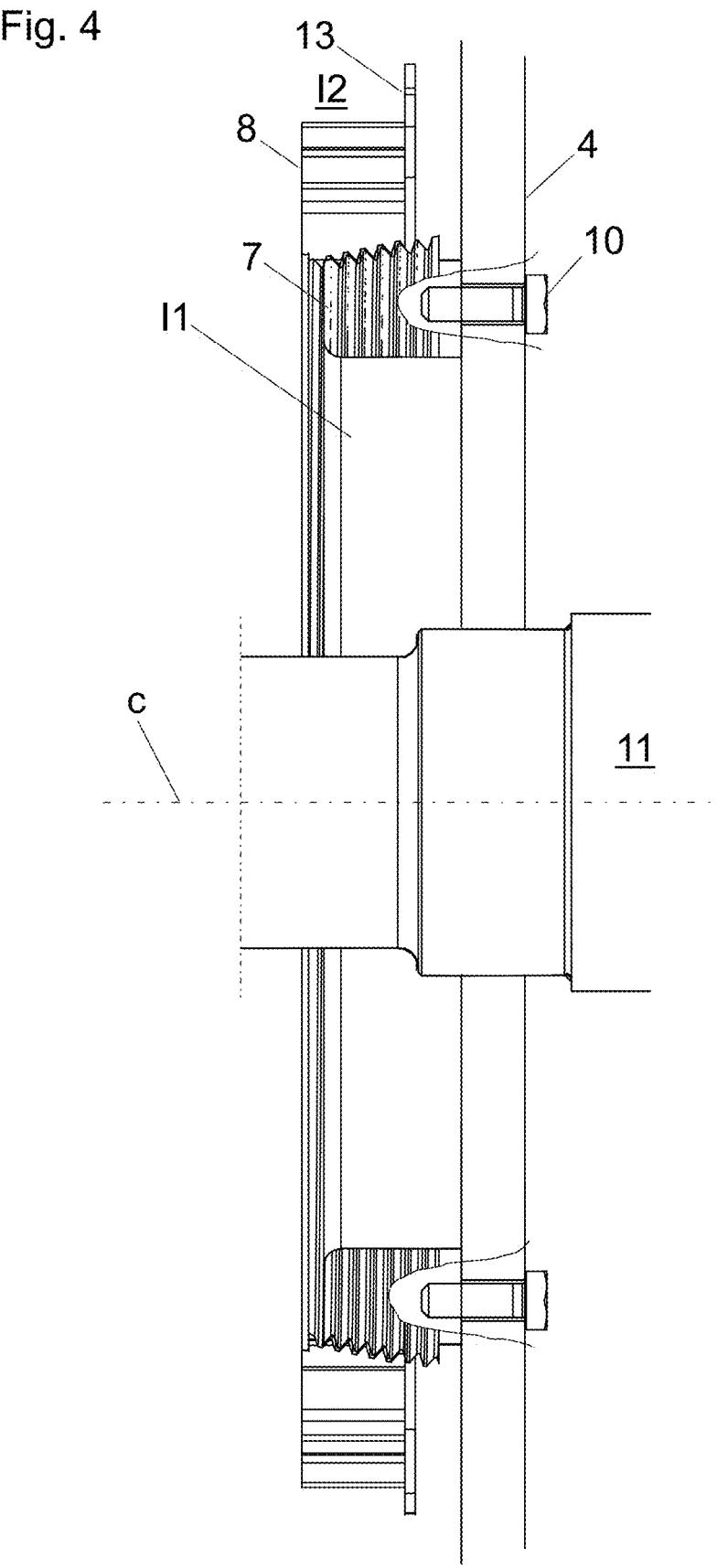
FIG. 4 illustrates structure of the nut member and the screw member fitted together.

The passenger conveyor 1 moreover comprises a brake 6 for braking rotation of the diverting wheel 4. FIG. 2 illustrates a schematic presentation of the brake 6. The brake 6 comprises a screw member 7 having a conical threaded external rim 7a, and a nut member 8 having a conical threaded internal rim 8a. The threads of the screw and nut are counterparts for each other, and the screw member 7 and nut member 8 are screwed together, such that the nut member is around the screw member, their threads engaging each other. Said screw member 7 is connected with the diverting wheel 4 (e.g., via elements 10 as shown in FIGS. 3-4) for being driven by the diverting wheel 4, and arranged to transmit rotation to the nut member 8 mounted thereon, at least partially via their threaded engagement, such that they are rotatable together, in particular as one unit, by the diverting wheel 4. Their engagement being established by the threaded rims, relative rotation between them can be caused, which causes screwing of the screw member 7 within the nut member 8. The brake 6 moreover comprises a stopping device 9 for stopping rotation of the other of said screw member and nut member 7,8, for thereby causing relative rotation between the screw member 7 and nut member 8 if said screw member 7 rotates driven by the diverting wheel 4.

Due to above described structure the screw member 7 and nut member 8 are tightenable together, to engage more firmly with each other, by screwing of the screw member 7 deeper into the nut member 8, i.e. towards the tip of the conical threaded internal rim. When tightened together, the screw member 7 and nut member 8 do not freely rotate relative to each other but they are stuck to each other.

Pre-tightening is arranged to be such that it suffices to maintain the relative positioning of the screw member 7 and the nut member 8 the same unless the stopping device 9 stops rotation of the nut member 8, and the screw member 7 is rotated by the diverting wheel 4.

Rotation of the diverting wheel 4 in its first rotation direction D1 causes the screw member 7 to screw deeper into the nut member 8, such that the screw member 7 and nut member 8 become gradually tightened to be immovable relative to each other, if the stopping device 9 has stopped rotation of said other of said screw member and nut member 7,8. Said tightening occurs because of the conical shape of the rims of the screw member 7 and the nut member 8 on which the threads are disposed. When these members 7,8 are rotated relative to each other in tightening direction, the threads of these members 7,8 guide the screw member deeper into the nut member, but the screw member 7 cannot pass through the nut member 8 due to their conical shapes. Instead, the screw member 7 becomes wedged incrementally tighter into the nut member 8 as the rotation progresses. The threads of the screw member 7 and the nut member 8 engaging each other, there is friction between these members 7,8, which resists their rotation relative to each other. Due to the conical shape of the rims of the screw member 7 and the nut member 8 on which the threads are disposed, tightening of the screw member 7 and the nut member 8 increases the normal forces existing between the screw member 7 and the nut member 8. Thereby the tightening increases the friction forces between these parts which resist their rotation relative to each other. Friction forces slow down the relative rotation between these parts and eventually stops it completely. Thus, the diverting wheel 4 becomes stopped as well. Said first rotation direction D1 is preferably the rotation direction in which the diverting wheel 4 rotates when the conveying elements 3 of the inclined section that are accessible to stand on by passengers move at an inclined angle downwards. Arrow 22 in FIG. 3 illustrates the direction in which the nut member 8 moves in said tightening. Arrows 23 and 24 in FIG. 3 illustrate the direction in which the screw member 7 and the nut member 8 preferably expand when they are tightened strongly. For enabling such a deformation, it is advantageous that the nut member 8 is surrounded by an empty space I2 outside it in radial direction whereto it is free to radially expand when tightened together with the screw member 7, and/or that the screw member 7 has an empty inside space I1 inside it in radial direction whereto it is free to radially expand when tightened together with the nut member 8. The deformation facilitates that the normal forces and friction between the screw member 7 and the nut member 8 increases in an advantageous way. At least part of the energy is transformed into heat due to friction. The deformation may absorb part of the energy needed for braking. Generally, the aforementioned deformation is advantageous as it facilitates that the stopping is not extremely sudden.

As an alternative or in addition to the aforementioned radial expansion of the one or both of the nut member 8 and the screw member 7, the threads of the nut member 8 and/or the screw member 7 are arranged to deform when the nut member 8 and/or the screw member 7 are tightened together.

The cross section of both the screw member 7 and nut member 8 is such that the peaks of the threads of the screw member 7 extend along a line L1 oriented towards the central axis c of the external rim of the screw member 7, and the peaks of the threads of the nut member 8 extend along a line L2 oriented towards the central axis c of the internal rim nut member 8, respectively. The line is preferably straight which is the case in the embodiment illustrated in FIG. 3. The line might however slightly differ from straight. The aforementioned lines of the screw member 7 and nut member 8 are preferably parallel or at least substantially parallel.

Said screw member 8 is connected with the diverting wheel 4 by a connection transmitting rotation between the two in two opposite rotation directions, said transmitting preferably being rigid. This is preferably implemented such that the screw member 8 is fixed to the diverting wheel 4, e.g. by aid of one or more bolts as presented in FIG. 3. Alternatively, this can be implemented such that the screw member 8 is fixed to the shaft 11 on which the diverting wheel 4 is rigidly connected.

In the preferred embodiments illustrated in FIGS. 1-4, the stopping device 9 is such that it comprises a stopping member 9a movable to act on the nut member 8 for stopping rotation thereof, for thereby causing relative rotation between the screw member and nut member, when said screw member 7 is rotated.

In the preferred embodiments illustrated in FIGS. 1-4, the nut member 8 comprises a cogged rim, and said stopping member 9a is movable into rotational path of at least one of the cogs 12 of the cogged rim. Utilizing a cogged rim is advantageous structure due to its simplicity, reliability and usability with different alternative stopping members 9a, and with different means for moving the stopping member 9a. However, a stopping member could of course be arranged to stop the rotation of the nut member 8 differently than what is presented in context of the preferred embodiments. For example, it is an alternative that frictional engagement is utilized instead of the mechanical locking occurring in the embodiment utilizing a stopping member movable into rotational path a cog 12 of a cogged rim.

The passenger conveyor 1 preferably comprises a control arrangement 18,20,21;13,15,16 arranged to control operation of the stopping device 9. The aforementioned control arrangement 18,20,21;13,15,16 is arranged to control movement of the stopping member 9a. FIGS. 5-8 illustrate preferred details for controlling operation of the stopping device 9.

Figure 5:
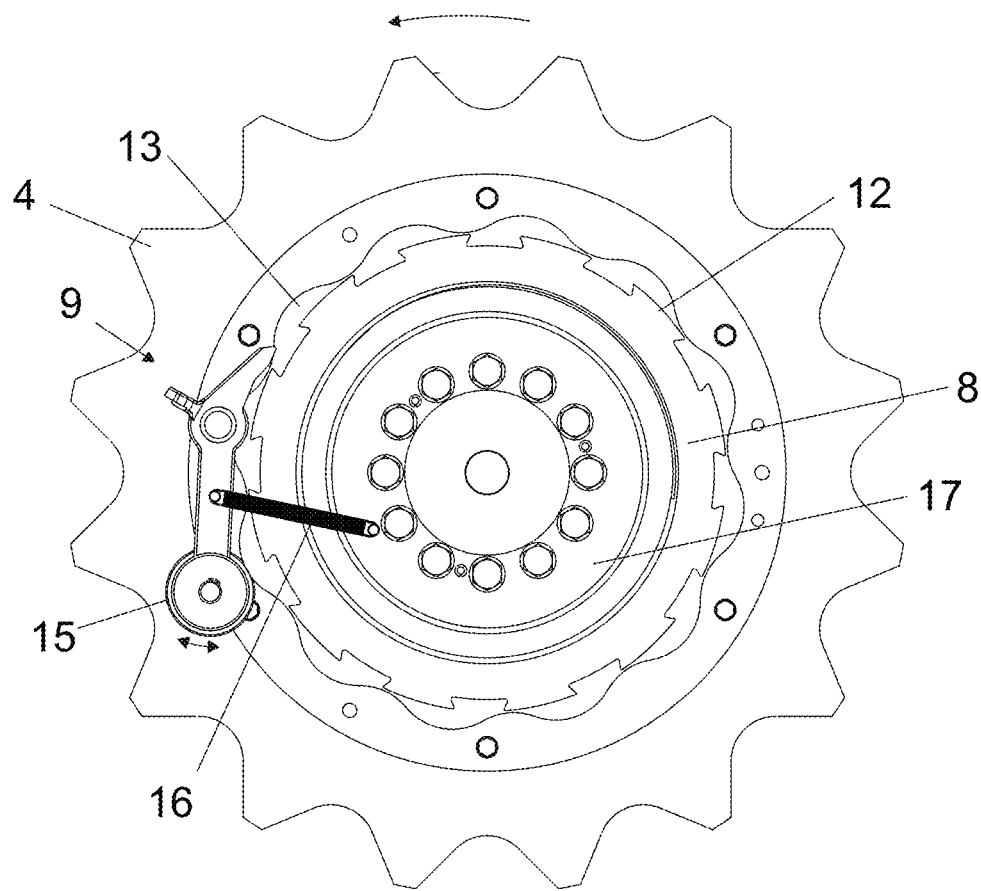
FIGS. 5-7 illustrate preferred details for controlling operation of the stopping device of FIG. 2.
Figure 6:
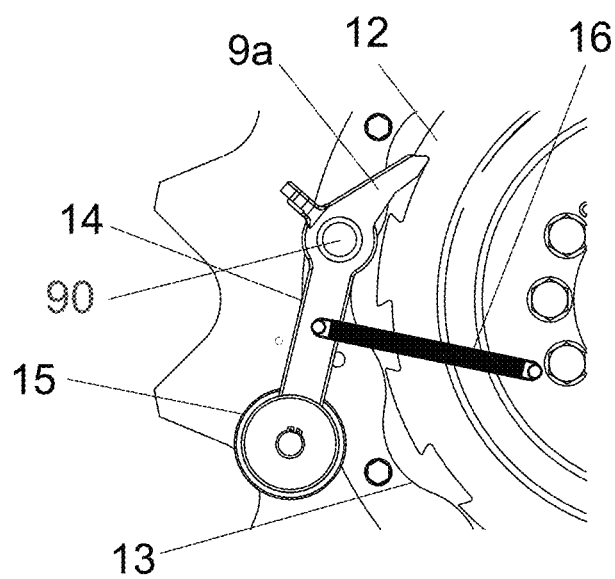

In the embodiment illustrated in FIG. 5, the control arrangement 13,15,16 for controlling movement of the at least one stopping member 9a comprises a cam wheel 13 rotated by the diverting wheel 4, as well as a pendulum 14, which is pivotal around a fulcrum 17. The cams of the cam wheel 13 are curved such that a roller 15 can run along them. The pendulum comprises a roller 15 spring-tightened to run along the rim of the cam wheel 13, the roller 15 being movable radially outwards, i.e. from the rotation axis of the cam wheel 13, by the cams of the cam wheel 13 and returned radially inwards, i.e. towards the rotation axis of the cam wheel 13, by a spring mechanism 16. If rotational speed of the cam wheel 13 exceeds a limit, the roller 15 is arranged to loose contact with the cam wheel 13, thrown by a cam of the cam wheel 13, such that the pendulum turns to such a position that a stopping member 9a thereof extends into path of a cog 12 of the aforementioned cogged rim. Above the limit, the spring force of the spring mechanism 16 is not anymore adequate to return the roller 15 radially inwards so swiftly that a contact with the cam wheel 13 is maintained. The stopping member 9a extending into path of a cog 12 of a cogged rim of the nut member, further rotation of the cam wheel 13 (at a speed exceeding said limit) will make the cog 12 of a cogged rim of the nut member 8 and the aforementioned part 9a collide, and stop the rotation of the nut member 8. This produces relative rotation between nut member 8 and screw member 7 as earlier described. FIG. 6 illustrates a condition where the stopping member 9a extends into path of a cog 12 of a cogged rim. The spring mechanism 16 is preferably such that it comprises at least one spring connected between the pendulum 14 and a stationary member of the conveyor 1, such as a stationary support member 90 of the shaft 11 of the diverting wheel 4, for example.

Figure 7:
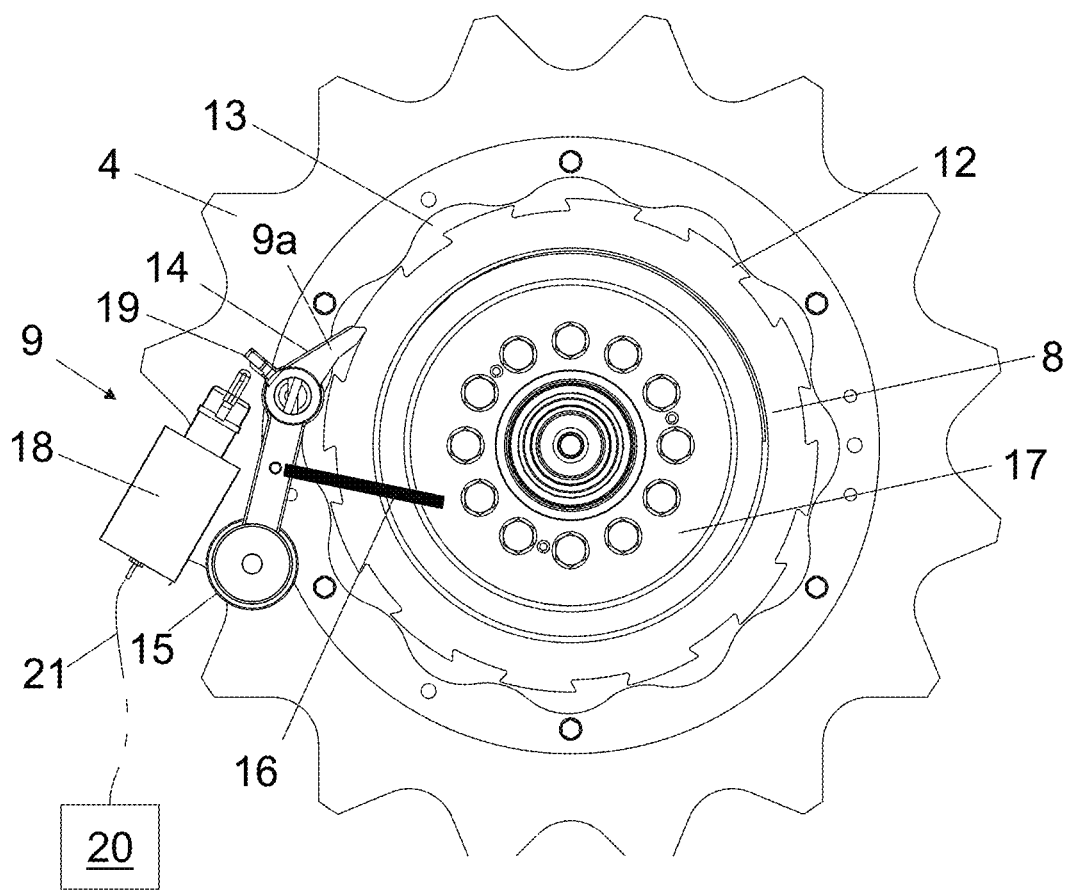

In the embodiment illustrated in FIG. 7, the control arrangement 18,20,21;13-16 for controlling movement of the at least one stopping member 9a is otherwise in accordance with the embodiment of FIGS. 5-6 but further comprises an electrical controller 20 configured to control the stopping device 9 over an electrical bus 21. The controller 20 is configured to activate the stopping device 9 to stop rotation of the other of said screw member and nut member 7,8, in particular when one or more predetermined criteria are met, preferably including overspeed detected in one or more of moving parts of the conveyor 1. In this embodiment, the stopping device 9 comprises an electrically controlled actuator 18, such as a solenoid.

The aforementioned electrically controlled actuator 18, such as a solenoid, is arranged to actuate the stopping member 9a to act on the nut member 8 for stopping rotation thereof, for thereby causing relative rotation between the screw member and nut member, when said screw 7 is rotated. In the presented embodiment electrically controlled actuator 18 is arranged particularly to actuate the stopping member 9a to move into rotational path of at least one of the cogs 12 of the cogged rim. This is implemented such that the electrically controlled actuator 18 is arranged to actuate the stopping member 9a by pushing a lever 19 of the pendulum 14 to pivot it such that the stopping member 9a moves into rotational path of at least one of the cogs 12.

Figure 8:
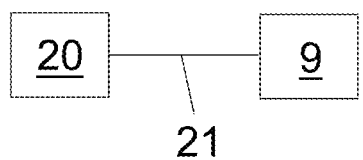
FIG. 8 illustrates a block diagram of a preferred control arrangement for controlling operation of the stopping device of FIG. 2.

FIG. 8 illustrates a block diagram of the control arrangement for controlling movement of the at least one stopping member 9a, where it comprises an electrical controller 20 configured to control the stopping device 9 over an electrical bus 21.

Generally, the control arrangement for controlling movement of the at least one stopping member 9a can be implemented also without a cam-operated pendulum as presented in FIGS. 5-7. The cam operation provides a relatively fail safe solution where rotation speed becomes reliably monitored. However, its' presence is not necessary. At simplest, the control arrangement can comprise an actuator arranged to operate the stopping member 9a and controlled by the electrical controller 20, the actuator preferably being then a solenoid. The stopping member 9a can then be movable by linear motion or pivotal around a fulcrum.

Preferably, the cone angle (x) of the conical threaded external rim of the screw member 7 and the cone angle (y) of the conical threaded internal rim of the nut member 8 are each in the range of 1-20 degrees, most preferably in the range of 5-15 degrees, wherein the cone angle (x) is the angle between line L1 and the central axis c of the external rim of the screw member 7, and the cone angle (y) is the angle between line L2 and the central axis c of the internal rim of the nut member 8. The cone angles of this kind provide that the tightening occurs progresses advantageously. Preferably, said cone angles of the screw member 7 and the nut member 8 are the same or at least substantially the same.

Preferably, the rise angle of the threads of the screw member 7 and the rise of the threads of the nut member are in the range of 1-10 degrees, more preferably in the range of 1-5 degrees, most preferably in the range of 1-3 degrees.

Preferably, the rise of the threads of the screw member 7 and the nut member are the same or at least substantially the same. The rise in millimeters can be for example 1-5 mm/round, e.g. 3 mm/round.

Generally, the passenger conveyor 1 can be an escalator or an autowalk. The aforementioned conveying elements 3 are steps if the people mover is an escalator and pallets or a conveying belt if the people mover is an autowalk. As mentioned, the band 2 can comprise an inclined conveying section for conveying passengers, who stand on the conveyor elements, at an inclined angle upwards or downwards. In this case, the solution is particularly advantageous as in this case the passenger conveyor has the risk of rushing downwards due to gravity affecting on the passengers. Such an inclined conveying section is comprised in escalators, and when the passenger conveyor is an autowalk, it can have an inclined conveying section (in this case a ramp section). The solution is most advantageous when the passenger conveyor is an escalator, because in escalators the inclination angle is steep enough to cause realistic risk of rushing downwards due to gravity affecting on the passengers.

In the illustrated examples the stopping device 9 is arranged to stop rotation of the nut member 8 and the screw member is connected with the diverting wheel 4 for being driven by the diverting wheel 4, and arranged to transmit rotation to the nut member 8, because this order is simple to implement. However, the structure could alternatively be inversed such that the stopping device 9 is arranged to stop rotation of the screw member and the nut member is connected with the diverting wheel 4 for being driven by the diverting wheel 4, and arranged to transmit rotation to the screw member 8.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A passenger conveyor, comprising
   a band of conveying elements, the band of conveying elements including a plurality of conveying elements;
   a diverting wheel configured to divert a passage of the band of conveying elements and/or a traction member thereof; and
   a brake configured to brake rotation of the diverting wheel,
   wherein the brake includes
      a screw member having a conical threaded external rim,
      a nut member having a conical threaded internal rim, the screw member and nut member being screwed together, wherein one of said screw member and nut member is connected with the diverting wheel such that said one of said screw member and nut member is configured to be driven by the diverting wheel, and
      a stopping device configured to stop rotation of an other of said screw member and nut member.

2. The passenger conveyor according to claim 1, wherein the screw member and nut member are rotatable together by the diverting wheel.

3. The passenger conveyor according to claim 1, wherein said one of said screw member and nut member is said screw member and said other of said screw member and nut member is said nut member.

4. The passenger conveyor according to claim 1, wherein the screw member and nut member have been pre-tightened together by screwing of the screw member into the nut member.

5. The passenger conveyor according to claim 1, wherein the screw member and nut member are tightenable together to engage more firmly with each other, by screwing of the screw member deeper into the nut member.

6. The passenger conveyor according to claim 1, wherein the diverting wheel is configured to rotate in a first rotation direction to cause screwing of the screw member deeper into the nut member, in response to the stopping device having stopped rotation of said other of said screw member and nut member.

7. The passenger conveyor according to claim 1, wherein the band of conveying elements includes an inclined conveying section configured to convey passengers standing on the plurality of conveying elements at an inclined angle upwards or downwards, the inclined conveying section including one or more conveying elements of the plurality of conveying elements, the one or more conveying elements configured to be stood upon by the passengers.

8. The passenger conveyor according to claim 7, wherein
   the diverting wheel is configured to rotate in a first rotation direction to cause screwing of the screw member deeper into the nut member, in response to the stopping device having stopped rotation of said other of said screw member and nut member, and
   said first rotation direction is a rotation direction in which the diverting wheel rotates based on the one or more conveying elements of the inclined conveying section moving at an inclined angle downwards.

9. The passenger conveyor according to claim 1, wherein said one of said screw member and nut member is connected with the diverting wheel by a connection that is configured to transmit rotation between the screw member and the nut member in two opposite rotation directions.

10. The passenger conveyor according to claim 1, wherein said one of said screw member and nut member is fixed on the diverting wheel or a shaft on which the diverting wheel is mounted.

11. The passenger conveyor according to claim 1, wherein
   the nut member is surrounded by an empty space outside the nut member in a radial direction, such that the nut member is free to radially expand when tightened together with the screw member, and/or
   the screw member has an empty inside space, such that the screw member is free to radially expand when tightened together with the nut member.

12. The passenger conveyor according to claim 1, further comprising a control arrangement configured to control operation of the stopping device.

13. The passenger conveyor according to claim 1, wherein the stopping device includes at least one stopping member that is movable to act on the other of said screw member and nut member to stop rotation thereof, to thereby cause relative rotation between the screw member and nut member.

14. The passenger conveyor according to claim 13, further comprising a control arrangement configured to control operation of the stopping device, wherein the control arrangement is configured to control movement of the at least one stopping member.

15. The passenger conveyor according to claim 13, wherein said other of said screw member and nut member includes a cogged rim, and said at least one stopping member is movable into a rotational path of at least one cog of a plurality of cogs of the cogged rim.

16. The passenger conveyor according to claim 12, wherein the control arrangement includes an electrical controller configured to control the stopping device over an electrical bus.

17. The passenger conveyor according to claim 16, wherein the electrical controller is configured to activate the stopping device to stop rotation of the other of said screw member and nut member, based on overspeed being detected in one or more moving parts of the passenger conveyor.

18. The passenger conveyor according to claim 1, wherein the stopping device includes an electrically controlled actuator.

19. The passenger conveyor according to claim 18, wherein the electrically controlled actuator is configured to actuate the stopping device to act on the other of said screw member and nut member to stop rotation thereof.

20. A brake configured to brake rotation of a diverting wheel of a passenger conveyer, the brake comprising:
a screw member having a conical threaded external rim;
a nut member having a conical threaded internal rim, the screw member and nut member being screwed together, wherein one of said screw member and nut member is configured to be connected with the diverting wheel such that said one of said screw member and nut member is configured to be driven by the diverting wheel; and
a stopping device configured to stop rotation of an other of said screw member and nut member.

21. The brake of claim 20, wherein the screw member and nut member are rotatable together by the diverting wheel.

22. The brake of claim 20, wherein the screw member and nut member are tightenable together to engage more firmly with each other, by screwing of the screw member deeper into the nut member.

23. The brake of claim 20, wherein the screw member is configured to screw deeper into the nut member based on the diverting wheel rotating in a first rotation direction, in response to the stopping device having stopped rotation of said other of said screw member and nut member.

24. The brake of claim 20, wherein said one of said screw member and nut member is configured to be connected with the diverting wheel by a connection that is configured to transmit rotation between the screw member and the nut member in two opposite rotation directions.

* * * * *